(12) United States Patent
Sztuk et al.

(10) Patent No.: US 12,423,916 B1
(45) Date of Patent: Sep. 23, 2025

(54) EYE-TRACKING ASSISTED PASSTHROUGH RENDERING

(71) Applicant: Meta Platforms Technologies, LLC, Menlo Park, CA (US)

(72) Inventors: Sebastian Sztuk, Virum (DK); Alexander Sorkine Hornung, Zurich (CH); Daniel Maskit, London (GB); Ngoc Minh Dang, Basel (CH)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/612,041

(22) Filed: Mar. 21, 2024

(51) Int. Cl.
- *G06T 17/20* (2006.01)
- *G06F 3/01* (2006.01)
- *G06T 7/593* (2017.01)
- *G06T 19/00* (2011.01)

(52) U.S. Cl.
CPC ............ *G06T 17/205* (2013.01); *G06F 3/013* (2013.01); *G06T 7/593* (2017.01); *G06T 19/006* (2013.01); *G06T 2207/10012* (2013.01)

(58) Field of Classification Search
CPC .................................................. G06T 17/205
USPC .......................................................... 345/156
See application file for complete search history.

(56) References Cited

U.S. PATENT DOCUMENTS

| 11,170,521 B1 | 11/2021 | Ben Himane et al. |
| 2017/0171538 A1* | 6/2017 | Bell ...................... G06T 19/006 |
| 2019/0172216 A1* | 6/2019 | Ninan .................. H04N 13/128 |
| 2021/0160440 A1 | 5/2021 | Bleyer et al. |
| 2023/0097378 A1* | 3/2023 | Shimizu ............. G02B 27/0093 |
| | | 348/53 |
| 2023/0266820 A1* | 8/2023 | Uchida .................. G02B 30/22 |
| | | 345/156 |

FOREIGN PATENT DOCUMENTS

WO    2021126424 A1    6/2021

OTHER PUBLICATIONS

Extended European Search Report for European Patent Application No. 25160001.1, dated Jul. 30, 2025, 14 pages.

* cited by examiner

Primary Examiner — Long D Pham
(74) Attorney, Agent, or Firm — Greenberg Traurig, LLP

(57) ABSTRACT

A method includes receiving scene image data, comprising left and right images for each eye. Through an eye tracking module, the method includes determining the user's gaze direction or eye vergence. Using this information, the method includes identifying an object in the scene that the user is focusing on, and determining, using a depth estimation module, a left depth from the left eye to the object and a right depth from the right eye to the object. Further, based on the computed left and right depths, the method includes generating, for the left and right eye, constant left and right depth meshes, generating a left and right output images by projecting the left and right images on the corresponding constant left and right depth meshes. Additionally, the method includes displaying the left output image for the left eye and displaying the right output image for the right eye.

19 Claims, 11 Drawing Sheets

500

510 Receiving image data of the scene for displaying to the user, the image data includes a left image for a left eye and a right image for a right eye

515 Determining, via an eye tracking module, a gaze direction and an eye vergence for the user

520 Identifying, using the gaze direction and the eye vergence, an object in the scene that the user is focusing on

525 Determining, using a depth estimation module, a left depth from the left eye to the object and a right depth from the right eye to the object

530 Generating, for the left eye, a left depth mesh having constant depth based on the left depth

535 Generating, for the right eye, a right depth mesh having constant depth based on the right depth

540 Generating a left output image by projecting the left image on the left depth mesh

545 Generating a right output image by projecting the right image on the right depth mesh

550 Displaying the left output image for the left eye

555 Displaying the right output image for the right eye

| | |
|---|---|
| Receiving image data of the scene for displaying to the user, the image data includes a left image for a left eye and a right image for a right eye | 610 |
| Determining, via an eye tracking module, a gaze direction and an eye vergence for the user | 615 |
| Identifying, using the gaze direction and the eye vergence, an object in the scene that the user is focusing on | 620 |
| Determining, using a depth estimation module, a left depth from the left eye to the object and a right depth from the right eye to the object | 625 |
| Generating, for the left eye, a left depth mesh having constant depth based on the left depth | 630 |
| Generating, for the right eye, a right depth mesh having constant depth based on the right depth | 635 |
| Determining using a depth estimation module, a variable depth mesh for the scene | 637 |
| Generating a first left output image by projecting a first portion of the left image on the left depth mesh | 639 |
| Generating a first right output image by projecting a first portion of the right image on the right depth mesh | 641 |
| Generating a second left output image by projecting a second portion of the left image on the variable depth mesh, the second portion of the left image being complimentary to the first portion of the left image | 643 |
| Generating a second right output image by projecting a second portion of the right image on the variable depth mesh, the second portion of the right image being complimentary to the first portion of the right image | 645 |
| combining the generated first and second left output image resulting in the combined left output image | 647 |
| combining the generated first and second right output image resulting in the combined right output image | 649 |
| displaying the combined left output image for the left eye | 651 |
| displaying the combined right output image for the right eye | 653 |

*FIG. 6*

EYE-TRACKING ASSISTED PASSTHROUGH RENDERING

TECHNICAL FIELD

This disclosure relates to systems and methods designed for the immersive rendering of mixed-reality (MR) scenes for users.

BACKGROUND

A head-mounted device (HMD) featuring a stereo display can deliver an immersive experience within a three-dimensional environment. While wearing an HMD, a user's vision of the surrounding physical environment is blocked by the HMD's physical structure and display. Mixed Reality (MR) solves this issue by using the HMD's cameras to capture a real-time, low-latency live feed of the surrounding physical environment and display the live feed to the user, thereby enabling users to seamlessly perceive their environment as if they were not wearing an HMD. Additionally, users can augment their surroundings by overlaying virtual elements onto the real world.

"Passthrough" refers to the MR feature that allows user to see their physical surroundings while wearing an HMD. Information about the user's physical environment is visually "passed through" to the user by having the headset of the artificial reality system display information captured by the headset's external-facing cameras. Simply displaying the captured images would not work. Since the locations of the cameras do not coincide with the locations of the user's eyes, images captured by the cameras do not accurately reflect the user's perspective. In addition, since the images have no depth information, simply displaying the images would not provide the user with proper parallax effects if he were to shift away from where the images were taken. Incorrect parallax, coupled with user motion, could lead to motion sickness.

Passthrough images are generated by reprojecting or warping images captured by cameras of an artificial-reality device toward the user's eye positions using depth measurements of the scene (depth could be measured using depth sensors and/or machine-learning-based approaches). An artificial-reality headset may have a left external-facing camera and a right external-facing camera used for capturing images used for passthrough generation. Based on depth estimates of the scene, the left image captured by the left camera is reprojected to the viewpoint of the left eye, and the right image captured by the right camera is reprojected to the viewpoint of the right eye. The reprojected images captured by the cameras, when displayed to the user, would approximate how the captured scene would have appeared had it been observed from the perspective of the user's eyes.

Since reprojection relies on depth information of the physical scene, the accuracy of the depth representation (e.g., a depth mesh) plays an important role. In practice, generating a pixel-accurate depth representation in real-time for the entire visible scene is difficult. Not only is high-resolution and accurate depth sensing challenging, but it also needs to be sufficiently robust to accommodate different lighting conditions, object movement, head motion, occlusion, and other environmental factors. Further, generating a depth representation for the scene from the captured depth information can be computationally expensive. In the context of passthrough generation for MR, depth sensing and generation of the depth representation need to be achieved within stringent timing constraints, limited power budget, and heightened accuracy requirements. Thus, devising a suitable technique for generating depth representations for passthrough rendering has presented a complex challenge for developers and researchers.

Some existing systems address the foregoing challenge by approximating the depth of a scene using a continuous, spatially varying depth mesh that molds to the general contour of the scene depth. The depth mesh is analogous to a blanket that is thrown over the physical objects in the scene. The benefit of such a depth mesh is that it balances the tradeoff between capturing scene-depth information and computational complexity. The drawback, however, is that the continuous depth mesh would likely have several areas with inaccurate depth. For example, if the physical environment includes a foreground object and a background object, the depth mesh would likely approximate the actual depths of those objects fairly well. However, since the depth mesh is continuous (e.g., like a blanket), the region in the depth mesh between those two objects would not be accurate. The inaccuracies in the depth mesh, in turn, would result in inaccurate reprojection of passthrough images. The end result is that the passthrough images would exhibit visual artifacts in the form of deformations and temporal flicker.

Consequently, there is a demand for enhanced systems and methods capable of rendering passthrough scenes for users without introducing visual artifacts, particularly in areas where the user is viewing. The present disclosure offers solutions through systems and methods that effectively address these challenges.

SUMMARY OF PARTICULAR EMBODIMENTS

Embodiments described herein relate to an improved method of generating depth meshes and using them to reproject captured images of a scene into the eye space of a user for MR passthrough generation. The present disclosure balances the accuracy of the perceived passthrough scene with the system's power, latency, and computational constraints. This is achieved by leveraging eye-tracking information to determine three-dimensional locations in the scene (characterized by three-dimensional coordinates x, y, and z) where the user is viewing and prioritizing those locations when generating the depth representation for the scene. In particular embodiments, the depth representation may be a depth mesh with a single, constant depth value corresponding to the object of interest derived from the user's gaze direction. For example, the depth mesh may have a spherical contour (it could be a complete sphere or a partial sphere), and each eye of the user may have its own constant-depth depth mesh. The constant depth of the meshes may vary depending on the user's vergence and/or estimation or prediction of the object of interest to the user. For example, using an eye-tracking module of the user's headset, an MR system may determine the gazes of the user's eyes. The MR system may then use the user's gaze information to determine a vergence location or an object of interest for the user. The distance between the user's left eye and the vergence location or object of interest may be used to generate a constant-depth depth mash for the left eye. Similarly, the distance between the user's right eye and the vergence location or object of interest may be used to generate another constant-depth depth mash for the right eye. The MR system may then reproject images captured by the system's cameras toward the left and right eyes of the user using their respective depth meshes.

Advantages of using depth meshes with constant depth are that they are inherently stable and computationally inexpensive. Since a constant-depth depth meshes does not have spatially-varying depths that often include extremely inaccurate approximations between foreground and background objects, passthrough scenes generated using constant-depth depth meshes are not prone to deformations and warping. Furthermore, in the passthrough scene, the region of interest at which the user is looking would appear accurate since the depth meshes are generated based on the location of that region. Although objects that are closer or farther than the region of interest may not appear accurate, the inaccuracy would have minimal negative effects on the overall passthrough experience since the inaccurate portion of the scene is in the user's peripheral vision and likely not of interest to the user. Thus, using depth meshes with constant depth for reprojection provides a practical solution to the aforementioned challenges.

In some aspects, the techniques described herein relate to a method for displaying a scene to a user, the method including, by a computing device: receiving image data of the scene for displaying to the user, the image data includes a left image for a left eye and a right image for a right eye; determining, via an eye tracking module, a gaze direction or an eye vergence for the user; identifying, using the gaze direction or the eye vergence, an object in the scene that the user is focusing on; determining a left depth from the left eye to the object and a right depth from the right eye to the object; generating, for the left eye, a left depth mesh having a constant depth based on the left depth; generating, for the right eye, a right depth mesh having a constant depth based on the right depth; generating a left output image by projecting the left image on the left depth mesh; generating a right output image by projecting the right image on the right depth mesh; displaying the left output image for the left eye; and displaying the right output image for the right eye.

In some aspects, the techniques described herein relate to a method, wherein the computing device is communicatively connected to a left camera and a right camera of a head-mounted device worn by the user, and wherein the left image is obtained by the left camera and the right image is obtained by the right camera.

In some aspects, the techniques described herein relate to a method, wherein the eye tracking module includes cameras pointing at the left eye and the right eye of the user.

In some aspects, the techniques described herein relate to a method, wherein a location of the object is determined based on the eye vergence of the user.

In some aspects, the techniques described herein relate to a method, wherein the location of the object is further determined based on scene information.

In some aspects, the techniques described herein relate to a method, wherein identifying the object in the scene includes determining an intersection between the gaze direction of the user and a scene depth.

In some aspects, the techniques described herein relate to a method, wherein identifying the object in the scene includes determining an intersection between the gaze direction of the user and a 3D model of the scene.

In some aspects, the techniques described herein relate to a method, wherein identifying the object in the scene is further based on a current usage context of the computing device.

In some aspects, the techniques described herein relate to a method, wherein the left depth mesh and the right depth mesh are spherical.

In some aspects, the techniques described herein relate to a method, wherein the left depth mesh and the right depth mesh are planar.

In some aspects, the techniques described herein relate to a method, wherein the constant depth of the left depth mesh is different from the constant depth of the right depth mesh.

In some aspects, the techniques described herein relate to a method, further including: identifying, subsequent to generating the left depth mesh and the right depth mesh, a second object in the scene that the user is focusing on using a second gaze direction or a second eye vergence of the user, wherein the second object and the object are different; determining a second left depth from the left eye to the second object and a second right depth from the right eye to the second object; generating, for the left eye, a second left depth mesh having a constant depth based on the second left depth; generating, for the right eye, a second right depth mesh having a constant depth based on the second right depth; generating a second left output image using the second left depth mesh; generating a second right output image using the second right depth mesh; displaying the second left output image for the left eye; and displaying the second right output image for the right eye.

In some aspects, the techniques described herein relate to one or more computer-readable non-transitory storage media embodying software that is operable when executed to: receive image data of a scene surrounding a user, the image data includes a left image for a left eye and a right image for a right eye; determine, via an eye tracking module, a gaze direction or an eye vergence for the user; identify, using the gaze direction or the eye vergence, a region of interest in the scene; determine a left depth from the left eye to the region of interest and a right depth from the right eye to the region of interest; generate, for the left eye, a left depth mesh having a constant depth based on the left depth; generate, for the right eye, a right depth mesh having a constant depth based on the right depth; generate a left output image by projecting the left image on the left depth mesh; generate a right output image by projecting the right image on the right depth mesh; display the left output image for the left eye; and display the right output image for the right eye.

In some aspects, the techniques described herein relate to one or more computer-readable non-transitory storage media, wherein a location of the region of interest is determined based on the eye vergence of the user.

In some aspects, the techniques described herein relate to one or more computer-readable non-transitory storage media, wherein the location of the region of interest is further determined based on scene information.

In some aspects, the techniques described herein relate to one or more computer-readable non-transitory storage media, wherein the left depth mesh and the right depth mesh are spherical.

In some aspects, the techniques described herein relate to a system including: one or more processors; and one or more computer-readable non-transitory storage media coupled to one or more of the processors and storing instructions operable when executed by one or more of the processors to cause the system to: receive image data of a scene surrounding a user, the image data includes a left image for a left eye and a right image for a right eye; determine, via an eye tracking module, a gaze direction or an eye vergence for the user; identify, using the gaze direction or the eye vergence, a region of interest in the scene; determine a left depth from the left eye to the region of interest and a right depth from the right eye to the region of interest; generate, for the left eye, a left depth mesh having a constant depth based on the left depth; generate, for the right eye, a right depth mesh having a constant depth based on the right depth; generate a left output image by projecting the left image on the left depth mesh; generate a right output image by projecting the right image on the right depth mesh; display the left output image for the left eye; and display the right output image for the right eye.

In some aspects, the techniques described herein relate to a system, wherein a location of the region of interest is determined based on the eye vergence of the user.

In some aspects, the techniques described herein relate to a system, wherein the location of the region of interest is further determined based on scene information.

In some aspects, the techniques described herein relate to a system, wherein the left depth mesh and the right depth mesh are spherical.

The embodiments disclosed herein are only examples, and the scope of this disclosure is not limited to them. Particular embodiments may include all, some, or none of the components, elements, features, functions, operations, or steps of the embodiments disclosed herein. Embodiments according to the disclosure are in particular disclosed in the attached claims directed to a method, a storage medium, and a system, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 5 is an example method for displaying a scene to a user by projecting images of objects to constant depth meshes, in accordance with disclosed embodiments.

FIG. 6 is another example method for displaying a scene to a user by projecting at least some portions of images of objects to constant depth meshes, in accordance with disclosed embodiments.

DESCRIPTION OF EXAMPLE EMBODIMENTS

Figure 1:
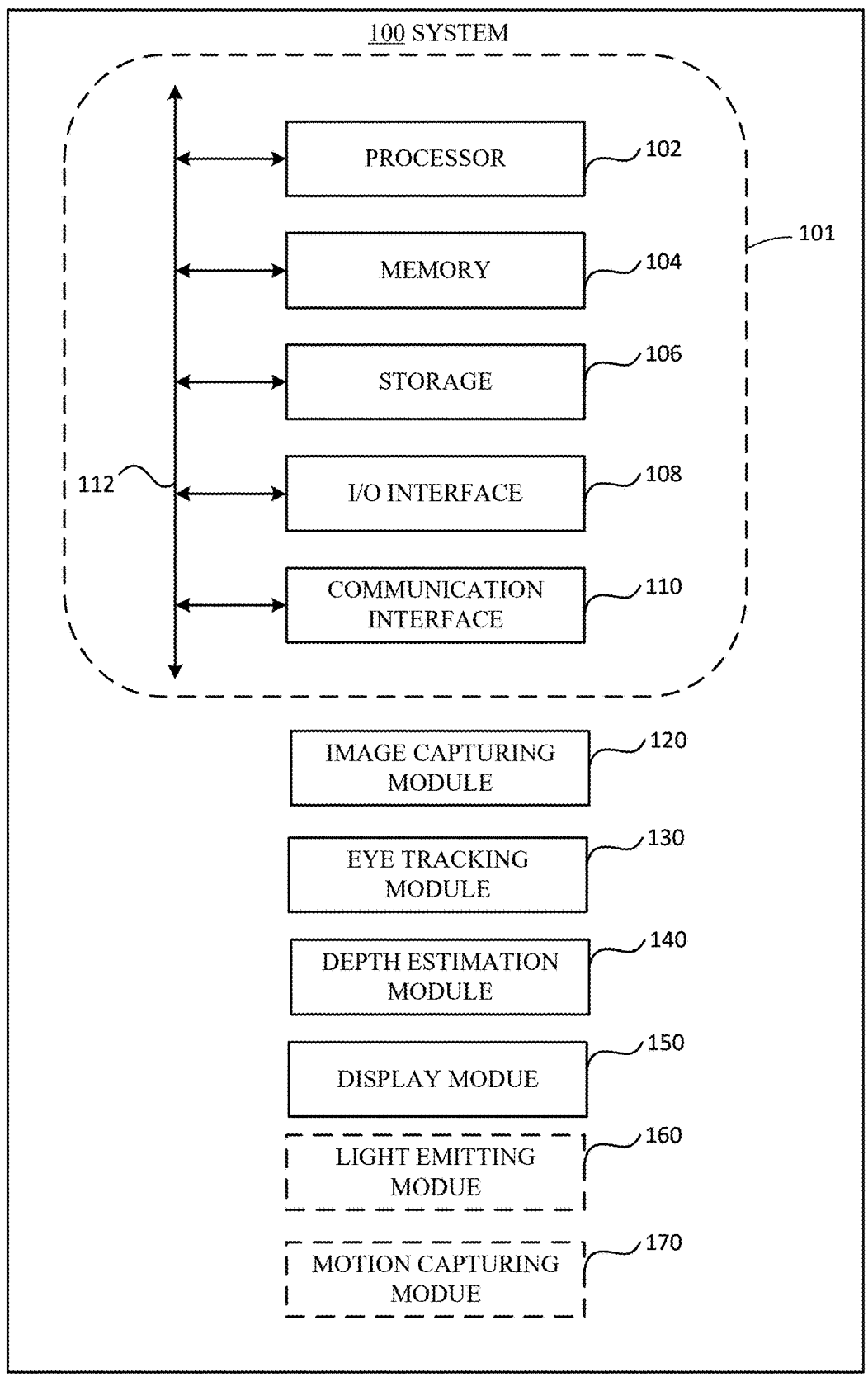
FIG. 1 is an illustrative system for presenting a scene to a user, in accordance with disclosed embodiments.

In the following description, for the purposes of explanation, numerous specific details are set forth to provide a thorough understanding of the present disclosure. It will be apparent, however, that embodiments of the present disclosure may be practiced without these specific details. In other instances, well-known structures and devices are shown in block diagram form to avoid unnecessarily obscuring the description of the present disclosure.

The text of this disclosure, in combination with the drawing figures, is intended to state in prose the algorithms that are necessary to program the computer to implement various embodiments, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement embodiments of the present disclosure.

Various embodiments may be described in this disclosure to illustrate various aspects. Other embodiments may be utilized and structural, logical, software, electrical, and other changes may be made without departing from the scope of the embodiments that are specifically described. Various modifications and alterations are possible and expected. Some features may be described with reference to one or more embodiments or drawing figures, but such features are not limited to usage in the one or more embodiments or figures with reference to which they are described. Thus, the present disclosure is neither a literal description of all embodiments nor a listing of features that must be present in all embodiments.

Devices that are described as in communication with each other need not be in continuous communication with each other, unless expressly specified otherwise. In addition, devices that are in communication with each other may communicate directly or indirectly through one or more intermediaries, logical or physical.

A description of an embodiment with several components in communication with one other does not imply that all such components are required. Optional components may be described to illustrate a variety of possible embodiments and to illustrate one or more aspects of the present disclosure more fully.

Similarly, although process steps, method steps, algorithms, or the like may be described in sequential order, such processes, methods, and algorithms may generally be configured to work in different orders, unless specifically stated to the contrary. Any sequence or order of steps described in this disclosure is not a required sequence or order. The steps of the described processes may be performed in any order practical. Further, some steps may be performed simultaneously. The illustration of a process in a drawing does not exclude variations and modifications, does not imply that the process or any of its steps are necessary, and does not imply that the illustrated process is preferred. The steps may be described once per embodiment but need not occur only once. Some steps may be omitted in some embodiments or some occurrences, or some steps may be executed more than once in each embodiment or occurrence. When a single device or article is described, more than one device or article may be used in place of a single device or article. Where more than one device or article is described, a single device or article may be used in place of more than one device or article.

The functionality or features of a device may be alternatively embodied by one or more other devices that are not explicitly described as having such functionality or features. Thus, other embodiments need not include the device itself. Techniques and mechanisms described or referenced herein will sometimes be described in singular form for clarity. However, it should be noted that embodiments include multiple iterations of a technique or multiple manifestations of a mechanism unless noted otherwise. Process descriptions or blocks in figures should be understood as representing modules, segments, or portions of code that include one or more executable instructions for implementing specific logical functions or steps in the process. Alternate implementations are included within the scope of embodiments of the present disclosure in which, for example, functions may be executed out of order from that shown or discussed, including substantially concurrently or in reverse order, depending on the functionality involved.

Overview of the System

The embodiments presented herein relate to systems and methods designed for the rendering of passthrough scenes to users, employing a variety of display options, with an example display device being a virtual reality headset. These passthrough scenes may include various scenes from the physical environment of a user, such as rooms, houses, playgrounds, landscapes, and the like.

Additionally, the range of display devices is not limited to virtual reality headsets; it extends to include various alternatives. These include video screens, smartphones, glasses, smart augmented reality glasses, viewfinders of cameras, telescopes, binoculars, microscopes, and analogous devices.

As previously described, passthrough rendering is accomplished by capturing images of a scene using suitable cameras of a headset (e.g., external-facing RGB or monochrome cameras of a headset used for capturing images for passthrough generation), reprojecting the captured images onto a depth mesh of the environment of the user to generate passthrough images for the user's eyes, and displaying the passthrough images to the eyes of the user. In some cases, one passthrough image may be presented to the left eye of the user while another passthrough image may be presented to the right eye of the user. In various embodiments, various steps of rendering the scenes are accomplished by a system that includes a computing device, an image-capturing module, an eye-tracking module, a depth estimation module, and a display module.

For example, FIG. 1 illustrates an example system 100 for rendering a scene to a user based on captured image data and determined depth meshes. In various embodiments, system 100 may perform one or more steps of one or more methods described or illustrated herein. System 100 may include software instructions for performing one or more steps of the methods described or illustrated herein. Further, various other instructions may also provide various other functionalities of system 100, as described or illustrated herein. Various embodiments include one or more portions of system 100. System 100 may include one or more computing systems. Herein, reference to a computer system may include a computing device, and vice versa, where appropriate. Moreover, reference to a computer system may include one or more computer systems, where appropriate.

This disclosure contemplates any suitable number of computer systems that can be included in system 100. This disclosure contemplates system 100 taking any suitable physical form. As example and not by way of limitation, system 100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, a game console or a combination of two or more of these. Where appropriate, system 100 may include one or more computer systems, be unitary or distributed, span multiple locations, span multiple machines, span multiple data centers, or reside in a cloud, which may include one or more cloud components in one or more networks. Where appropriate, system 100 may perform without substantial spatial or temporal limitation one or more steps of one or more methods described or illustrated herein. As an example and not by way of limitation, system 100 may perform in real-time or in batch mode one or more steps of one or more methods described or illustrated herein. System 100 may perform at different times or at different locations one or more steps of one or more methods described or illustrated herein, where appropriate.

In various embodiments, system 100 includes a computing device 101, which includes a processor 102, memory 104, storage 106, an input/output (I/O) interface 108, a communication interface 110, and a bus 112. Further, system 100 includes an image-capturing module 120, an eye-tracking module 130, a depth estimation module 140, a display module 150, and optionally, a light emitting module 160 and a motion-capturing module 170. Although this disclosure describes and illustrates a particular system 100 having a particular number of particular components in a particular arrangement, this disclosure contemplates any suitable system having any suitable number of any suitable components in any suitable arrangement.

In various embodiments, processor 102 includes hardware for executing instructions, such as those making up a computer program. As an example and not by way of limitation, to execute instructions, processor 102 may retrieve (or fetch) the instructions from an internal register, an internal cache, memory 104, or storage 106; decode and execute them; and then write one or more results to an internal register, an internal cache, memory 104, or storage 106. In some embodiments, processor 102 may include one or more internal caches for data, instructions, or addresses. This disclosure contemplates processor 102 including any suitable number of any suitable internal caches, where appropriate. As an example and not by way of limitation, processor 102 may include one or more instruction caches, one or more data caches, and one or more translation lookaside buffers (TLBs). Instructions in the instruction caches may be copies of instructions in memory 104 or storage 106, and the instruction caches may speed up retrieval of those instructions by processor 102. Data in the data caches may be copies of data in memory 104 or storage 106 for instructions executing at processor 102 to operate on; the results of previous instructions executed at processor 102 for access by subsequent instructions executing at processor 102 or for writing to memory 104 or storage 106; or other suitable data. The data caches may speed up read or write operations by processor 102. The TLBs may speed up virtual address translation for processor 102. In particular embodiments, processor 102 may include one or more internal registers for data, instructions, or addresses. This disclosure contemplates processor 102 including any suitable number of any suitable internal registers, where appropriate. Where appropriate, processor 102 may include one or more arithmetic logic units (ALUs), be a multi-core processor, or include one or more processors 102. Although this disclosure describes and illustrates a particular processor, this disclosure contemplates any suitable processor.

In particular embodiments, memory 104 includes main memory for storing instructions for processor 102 to execute or data for processor 102 to operate on. As an example and not by way of limitation, system 100 may load instructions from storage 106 or another source (such as, for example, another system 100) to memory 104. Processor 102 may then load the instructions from memory 104 to an internal register or internal cache. To execute the instructions, processor 102 may retrieve the instructions from the internal register or internal cache and decode them. During or after the execution of the instructions, processor 102 may write one or more results (which may be intermediate or final results) to the internal register or internal cache. Processor 102 may then write one or more of those results to memory 104. In particular embodiments, processor 102 executes instructions in one or more internal registers or internal caches or in memory 104 (as opposed to storage 106 or elsewhere) and operates on data in one or more internal registers or internal caches or in memory 104 (as opposed to storage 106 or elsewhere). One or more memory buses (which may each include an address bus and a data bus) may couple processor 102 to memory 104. Bus 112 may include one or more memory buses, as described below. In particular embodiments, one or more memory management units (MMUs) reside between processor 102 and memory 104 and facilitate accesses to memory 104 requested by processor 102. In particular embodiments, memory 104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 104 may include one or more memories 104, where appropriate. Although this disclosure describes and illustrates a particular memory, this disclosure contemplates any suitable memory.

In particular embodiments, storage 106 includes mass storage for data or instructions. As an example and not by way of limitation, storage 106 may include a hard disk drive (HDD), a floppy disk drive, flash memory, an optical disc, a magneto-optical disc, magnetic tape, or a Universal Serial Bus (USB) drive or a combination of two or more of these. Storage 106 may include removable or non-removable (or fixed) media, where appropriate. Storage 106 may be internal or external to system 100, where appropriate. In particular embodiments, storage 106 is a non-volatile, solid-state memory. In particular embodiments, storage 106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), flash memory, or a combination of two or more of these. This disclosure contemplates mass storage 106 taking any suitable physical form. Storage 106 may include one or more storage control units facilitating communication between processor 102 and storage 106, where appropriate. Where appropriate, storage 106 may include one or more storage 106. Although this disclosure describes and illustrates particular storage, this disclosure contemplates any suitable storage.

In particular embodiments, I/O interface 108 includes hardware, software, or both, providing one or more interfaces for communication between system 100 and one or more I/O devices. System 100 may include one or more of these I/O devices, where appropriate. One or more of these I/O devices may enable communication between a person and system 100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 108 for them. Where appropriate, I/O interface 108 may include one or more device or software drivers enabling processor 102 to drive one or more of these I/O devices. I/O interface 108 may include one or more I/O interfaces 108, where appropriate. Although this disclosure describes and illustrates a particular I/O interface, this disclosure contemplates any suitable I/O interface.

In particular embodiments, communication interface 110 includes hardware, software, or both providing one or more interfaces for communication (such as, for example, packet-based communication) between system 100 and any other devices interfacing with system 100 via one or more networks. As an example and not by way of limitation, communication interface 110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 110 for it. As an example and not by way of limitation, system 100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, system 100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. System 100 may include any suitable communication interface 110 for any of these networks, where appropriate. Communication interface 110 may include one or more communication interfaces 110, where appropriate. Although this disclosure describes and illustrates a particular communication interface, this disclosure contemplates any suitable communication interface.

In particular embodiments, bus 112 includes hardware, software, or both coupling components of system 100 to each other. As an example and not by way of limitation, bus 112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 112 may include one or more buses 112, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In various embodiments, system 100 includes image-capturing module 120, which includes one or more image-capturing devices. These devices may consist of a wide range of suitable cameras, including those designed for capturing visible, infrared, or ultraviolet light. Camera options may feature Complementary Metal-Oxide-Semiconductor (CMOS) or Charge-Coupled Device (CCD) sensors, which come in various sizes and resolutions. These sizes include full-frame sensors, APS-C sensors, compact sensors, and the like, with resolutions ranging from a few to several tens of megapixels or even exceeding 50 megapixels. Additionally, the image-capturing devices may be equipped with various lens systems, such as zoom, wide-angle, fish-eye, telephoto, macro, tilt-shift, or any other suitable lenses. The image capturing module 120 may also include additional components like a flashlight (e.g., an LED flashlight), an independent power source (e.g., a battery) for operating the image-capturing devices, and a local data storage device for on-site image data storage.

In certain implementations, image-capturing module 120 may include one or more image-capturing devices for capturing images to be reprojected to the viewpoint of the user's eyes, thereby generating passthrough images. For example, a first image-capturing device may be used for capturing a first image of a scene, and a second image-capturing device may be used for capturing a second image of the same scene. These image-capturing devices can be positioned at a predetermined distance from each other. For instance, in the context of a VR headset, the first image-capturing device may be located near one eye (e.g., the left eye) of the user and herein referred to as the left camera, while the second image-capturing device may be positioned near the other eye (e.g., the right eye) of the user and herein referred to as the right camera. Images captured by the left camera may be reprojected to generate passthrough images for the user's left eye, while images captured by the right camera may be reprojected to generate passthrough images for the user's right eye. The distance between these two devices is typically approximately the same as the distance between the user's eyes, typically within a range of about 55 millimeters to about 80 millimeters.

In some implementations, each image-capturing device may include one or more cameras, often referred to as sensors. For example, an image-capturing device within image-capturing module 120 could include a primary sensor, such as a high-resolution sensor (e.g., an 8-30 megapixel sensor) with a digital sensor array of pixel sensors. Each pixel sensor may be designed with a sufficiently large size (e.g., a few microns) to capture an adequate amount of light from the camera's aperture. Additionally, the image-capturing device for passthrough or MR generation may include an ultra-wide sensor, a telephoto sensor, or any other suitable sensor, and the sensors could be configured to capture color or monochrome image data.

Eye tracking module 130 of system 100 may be configured to monitor the movement, including rotation, of the user's eyes. The MR system 100 may use eye tracking module 130 to determine a vergence location of the user's eyes and/or a region or object of interest of the user. This disclosure is not limited to any particular type of eye-tracking module 130. For example, system 100 may incorporate eye-tracking cameras that are tailored to detect eye motion, thus enabling the determination of the visual axes for both the left and right eyes and a gaze direction for the user. Various devices can be employed for eye tracking, including video-based tracking (e.g., cameras), infrared trackers, or any other suitable eye-tracking sensors (e.g., electrooculography sensors). Once the object within a scene is identified, the image capture devices can be configured to adjust their focal length to focus on a region of the scene surrounding the recognized object.

The depth estimation module 140 of system 100 is configured to estimate the depth information of the user's physical environment and generate a corresponding depth mesh. Depth estimation module 140 may use any suitable technique for estimating depth. For example, a stereo depth estimation module 140 may include a computing device executing programming instructions for calculating the distance to an object using triangulation. Additionally or alternatively, depth estimation module 140 may utilize various depth measuring devices, such as stereo cameras (e.g., stereo cameras use two or more cameras to capture images of a scene from slightly different angles, and the disparity between corresponding elements in the captured images may be used to estimate depth), structured light scanners (e.g., devices that project a structured light pattern, such as a grid or stripes, onto an object or environment, and based on a distortion of the structured pattern calculate depth), LiDARs, time-of-flight (ToF) sensors, ultrasonic sensors, or any other suitable sensors that may be used to estimate depth (e.g., moving cameras utilizing photogrammetry).

Display module 150 of system 100 is configured to display a scene to a user. Display module 150 may include one or more displays. For example, when display module 150 is part of a virtual headset, a left display may be configured to display the scene to the left eye of the user using image data captured by the left camera, while the right display may be configured to display the scene to the right eye of the user using image data captured by the right camera to simulate depth perception and provide a three-dimensional rendering to the user. In some cases, the left and right display may include corresponding left and right lenses to optimize the field of view and simulate natural vision. The virtual headset displays may use technologies such as LCD (Liquid Crystal Display) or OLED (Organic Light-Emitting Diode) to produce high-quality visuals. In addition to showcasing image data from the cameras, these displays can also exhibit virtual objects within the scene, annotations for scene objects, or execute transformations on objects (e.g., recoloring or reshaping) and display the modified versions.

Furthermore, in some embodiments, system 100 may include light-emitting module 160 configured to enhance the illumination of various objects within the scene observed by the user. The light emitting module may improve the system's 100's ability to capture images for passthrough generation, depth estimation, and/or tracking. Light emitting module 160 may include one or more light-emitting devices, which can encompass a wide range of options for emitting light to illuminate objects, including but not limited to light-emitting diodes (LEDs), infrared light emitters (such as infrared LEDs), fluorescent light sources, compact fluorescent light sources, incandescent light sources, halogen light sources, lasers, organic LEDs, black light sources, ultraviolet light sources, and the like.

Additionally, in some embodiments, system 100 may incorporate a motion-capturing module 170 (e.g., accelerometer or gyroscope). This module is designed to capture the movements of the image-capturing module 120, depth estimation module 140, and light emitting module 160. In scenarios where the image capturing module 120, depth estimation module 140, and light-emitting module 160 are integrated into a VR headset, motion capturing module 170 can be configured to record both translational and rotational displacements of the VR headset. This includes instances where the user rotates or moves their head.

The data on these displacements serves multiple purposes. It can be utilized to recalibrate the depth information captured by depth estimation module 140, to reacquire new depth data using depth estimation module 140, or to obtain new image data using image capturing module 120. Furthermore, the motion of the user's head can indicate a shift in the user's focus to a new object within the observed scene. This change in focus may, in turn, trigger further movements and adjustments in the image-capturing devices of image-capturing module 120 and the light-emitting sources of the light-emitting module 160.

In certain scenarios, the motion capturing module 170 may not only be configured to detect movements of the user's head but also to monitor the movements of one or more objects within the user's environment. When such object movements are detected, system 100 may determine that new image data needs to be captured by the image capturing module 120 or that a new depth mesh needs to be generated using the depth estimation module 140. For instance, if an object within the scene surrounding the user (e.g., a pet) moves within that scene, new image and depth data may be collected.

Figure 2A:
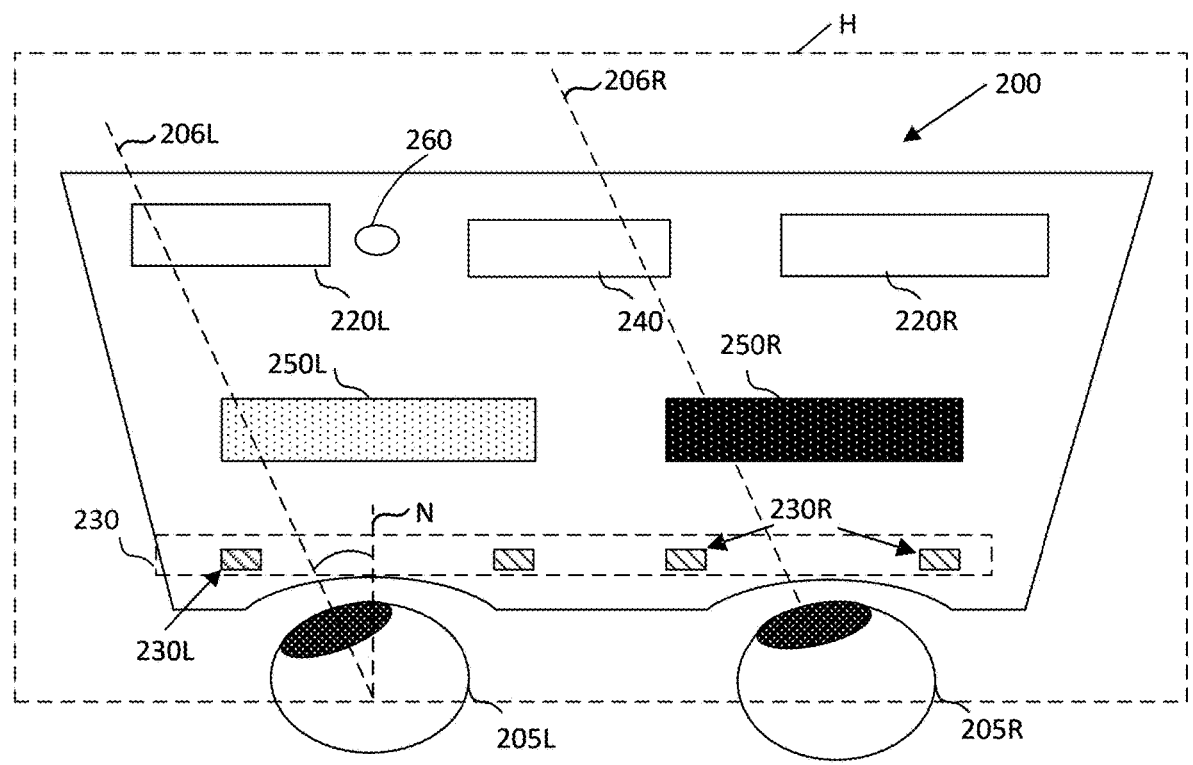
FIG. 2A is a schematic representation of a system for displaying a scene to a user in accordance with disclosed embodiments.
Figure 2B:
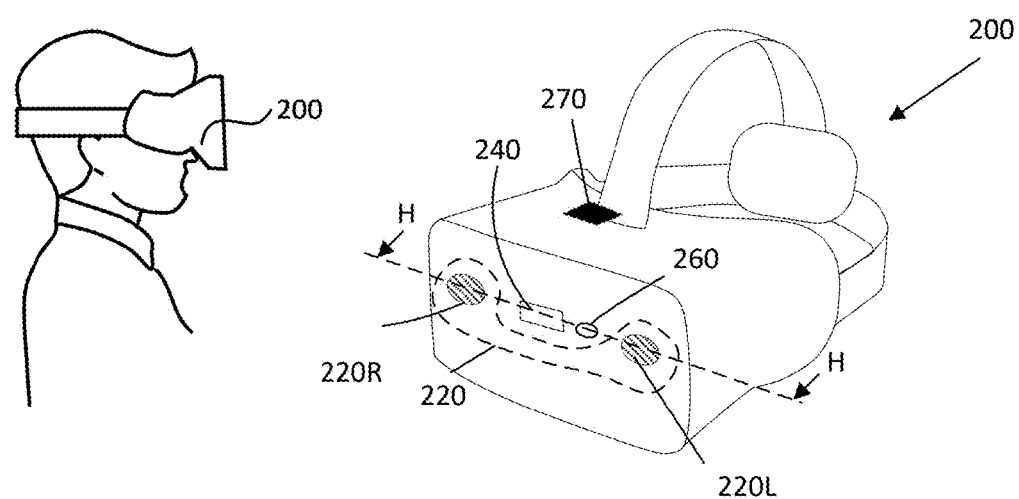
FIG. 2B is another representation of a system for displaying a scene to a user in accordance with disclosed embodiments.

In various embodiments, system 100 may take the form of a Virtual Reality (VR) headset. For example, FIGS. 2A and 2B illustrate an exemplary embodiment of System 200, representing an implementation of System 100. System 200 includes an image-capturing module 220 housing a first image-capturing device 220L (e.g., the left camera) and a second image-capturing device 220R (e.g., the right camera), a depth estimation module 240, a light-emitting module 260, and a motion estimation module 270. The modules of system 200 may be similar in structure and function to the corresponding modules of system 100.

In the schematic representation of System 200 in FIG. 2A, observed in a cross-sectional plane H, left camera 220L and right camera 220R are positioned near the corresponding left eye 205L and right eye 205R of the user. A left sight line 206L (also referred to as the left line of sight or ray 206L), representing the orientation of left eye 205L, is shown to pass through left camera 220L. FIG. 2A shows the angle θ formed by left sight line 206L with the normal direction N, determines the horizontal orientation of left eye 205L. Another orientational angle may indicate the vertical deviation of left sight line 206L from the normal direction N in a plane perpendicular to plane H. Similarly, a right sight line 206R represents the orientation of right eye 205R, and although it doesn't pass directly through right camera 220R, it comes sufficiently close. This proximity ensures that images captured by the right camera 220R closely resemble what the right eye 205R would naturally observe in the absence of the virtual reality headset.

Further, as shown in FIG. 2A, system 100 may include an eye tracking module 230, which may include a left eye tracking device 230L and a right eye tracking device 230R. Eye tracking module 230 may be similar in function or structure to the eye tracking module 130. These devices may include suitable cameras (as described above). In an example embodiment, left eye tracking device 230L may be configured to determine the orientation of left eye 205L, and right eye tracking device 230R may be configured to determine the orientation of right eye 205R.

Overview of the Method

In various embodiments described herein, methods of presenting a passthrough scene to a user involve generating depth meshes and acquiring image data for the passthrough scene. The left and right images, respectively gathered from a left camera (e.g., left camera 220L of system 200) and a right camera (e.g., right camera 220R of system 200), are then respectively reprojected to the left eye 205L and right eye 205R via the depth meshes.

Figure 3A:
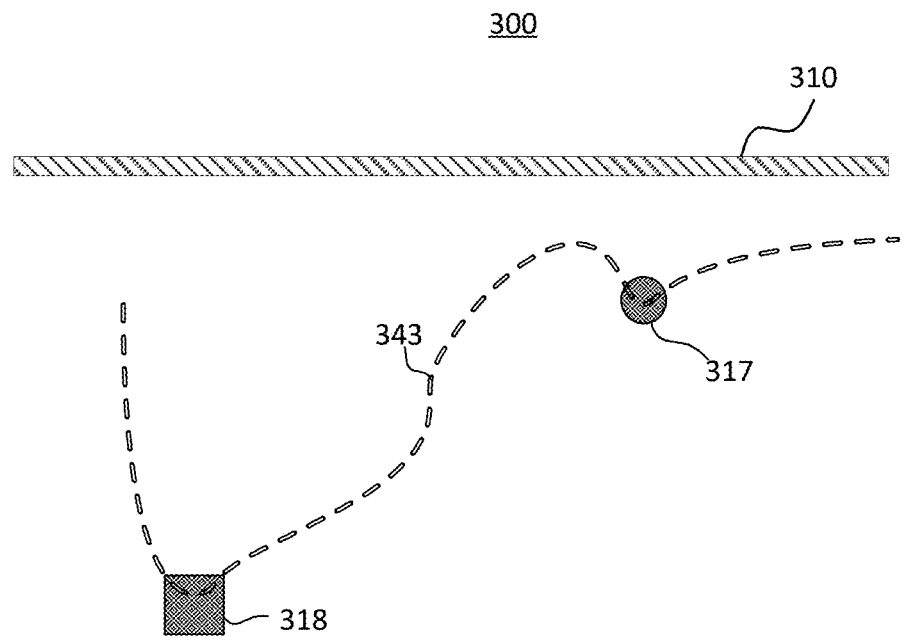
FIG. 3A is a schematic representation of a variable depth mesh and objects located in the user's environment, in accordance with disclosed embodiments.

FIG. 3A illustrates an example scene 300 where a depth mesh of variable depth (herein also referred to as a variable depth mesh) represented by curve 343 is illustrated along with images for objects 318 and 317. Additionally, FIG. 3A shows an area 310 representing a horizon, assumed to maintain a constant depth. For simplicity, FIG. 3A is a top-down two-dimensional view of a three-dimensional scene 300. The depth mesh 343 may be a continuous surface deformed based on the locations of objects 317, 318. For example, the depth estimation module 240 may estimate depth information in the scene, including the depths of objects 317, 318. The depth mesh 343 may be deformed so that its contour generally matches the estimated depths in the scene so that the deformed depth mesh 343 provides a representation of the scene depth. Reprojecting images captured using a camera (e.g., 220L or 220R) to a corresponding eye of the user (e.g., 205L or 205R) via the depth mesh 343 generates a passthrough image.

Artifacts arise when the depth mesh inaccurately represents the physical scene depth. For example, the depth mesh 343 in FIG. 3A may accurately reflect the depths of objects 317, 318. However, regions of the depth mesh 343 between object 317 and object 318 do not accurately reflect scene 300. This could be due to poor or inaccurate depth estimates and/or one of the shortcomings of using a continuous mesh to represent scene depth. Since the region of the depth mesh 343 between the two objects 317, 318 is inaccurate and varies significantly, a corresponding region in the reprojected passthrough image would often exhibit warping and deformation artifacts.

Figure 3B:
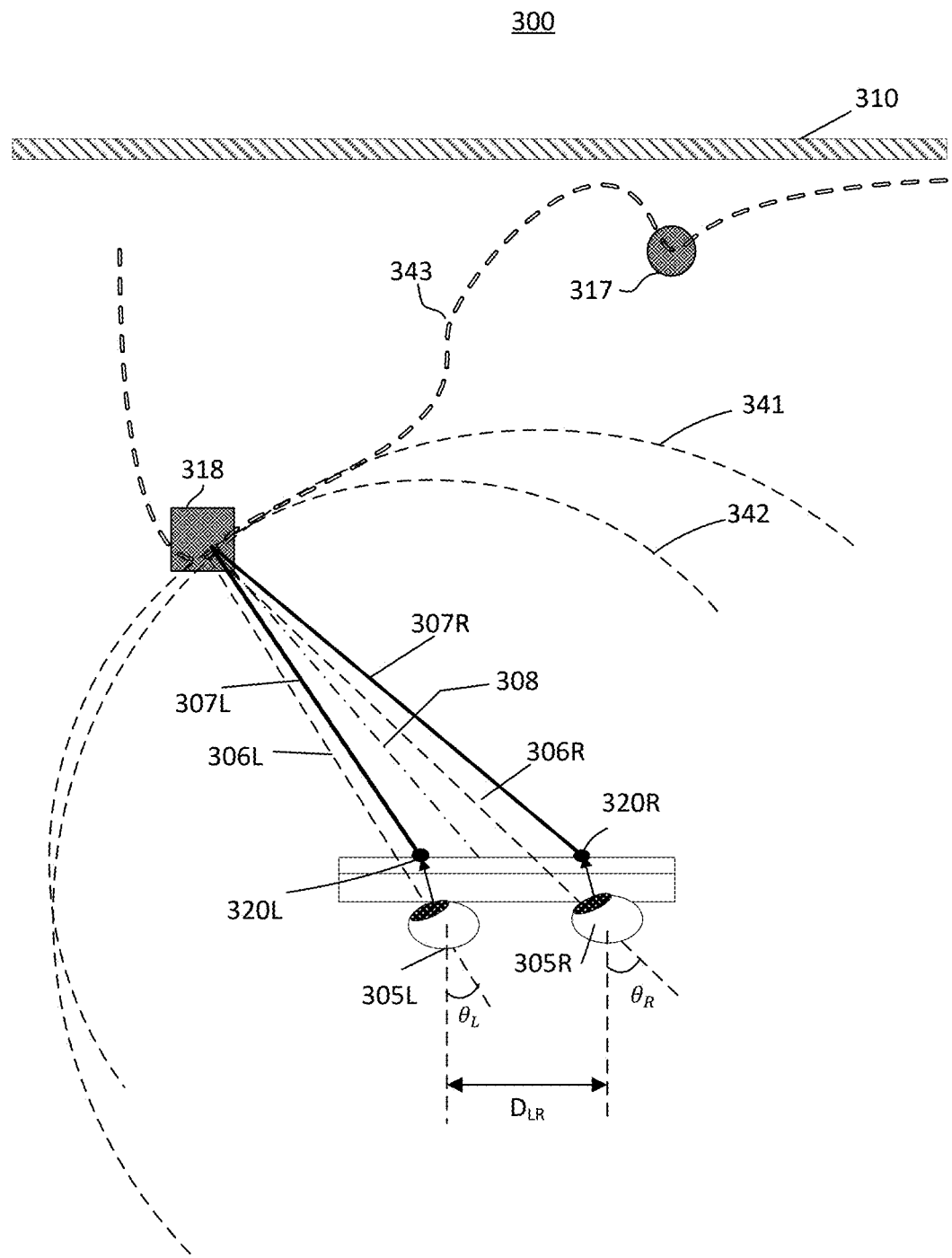
FIG. 3B is a diagram illustrating constant depth meshes, a variable depth mesh, and a system for displaying a scene to a user, in accordance with disclosed embodiments.

To address issues associated with the aforementioned artifacts, particular embodiments described herein use depth meshes with constant depth determined based on objects on which a user is focusing. FIG. 3B illustrates an example in which depth meshes with constant depth are used instead of the variable depth mesh 343 described with reference to FIG. 3A. The diagram in FIG. 3B illustrates that a user is focusing on object 318 by showing the user's general gaze direction 308, determined through an eye-tracking module similar (or identical) in structure or in function to eye-tracking module 130. The orientation of left eye 305L and right eye 305R is indicated by corresponding left and right sight lines 306L and 306R, converging at object 318, affirming the user's focus.

Once a vergence of the user's sight lines 306L, 306R is determined, the system may compute distances between the vergence location and each of the user's eyes. In embodiments where the vergence location is used to determine the desired depth for the constant depth meshes, no depth information of the scene would be required since vergence location can be computed based only on eye-tracking data. In the example shown in FIG. 3B, the user's vergence is at object 318. The system may use any known techniques to determine the distance between the object 318 and the user's eyes. For example, if the distance $D_{LR}$ between the left iris of the left eye 305L and the right iris of the right eye 305R is known (as depicted in FIG. 3B and determinable using the eye tracking module), and angles $\theta_L$ and $\theta_R$ are determined through the eye tracking module, the distance from left eye 305L to object 318 can be calculated along left sight line 306L, providing the left depth. Similarly, knowing $\theta_L$, $\theta_R$, and $D_{LR}$ facilitates calculating the distance from right eye 305R to object 318 along right sight line 306R, establishing the right depth.

In another embodiment, the desired depths for the constant depth meshes may be determined with the assistance of additional scene information, such as scene depth and/or contextual data. Such scene information may be used as an alternative signal or additional signal to the aforementioned vergence estimation to determine the user's region of interest. For example, if scene depth is known (e.g., based on depth measurements using depth estimation module 240), the intersection of the user's gaze and the scene depth may be used as the region of interest. Similarly, in embodiments where the system has a stored 3D model of the user's environment, the intersection between the user's gaze and the 3D model may be used as the region of interest. The 3D model may be generated based on any suitable 3D reconstruction technique. As yet another example, depending on the current usage context, the system may predict the likely region of interest to the user. For example, since the 3D location of MR content is known to the system, the system could use the 3D location of a particular MR content with which the user is engaging as the desired region of interest. Any combination of these examples of using scene information to determine the user's region of interest may be used in conjunction with vergence estimation to improve the system's overall prediction of the user's region of interest. Once the system identifies the region of interest, it can compute the depth of the region to each eye of the user.

Once both left and right depths are determined, a left and right constant depth mesh may be generated. For example, FIG. 3B shows a left depth mesh, denoted by arc 342, and a right depth mesh, denoted by arc 341. Left depth mesh 342 has a constant left depth corresponding to the distance between the user's left eye 305L and object 318, and right depth mesh 341 has a constant right depth corresponding to the distance between the user's right eye 305R and object 318. As illustrated in FIG. 3B, the right depth is larger than the left depth due to the greater distance of the right eye 305R from object 318, as indicated by the differences in radii between arcs 342 and 341.

The constant depth meshes 342, 341 may then be used for generating passthrough images. Cameras 320L and 320R are configured to capture image data of scene 300, including object 318. In an exemplary embodiment, camera 320L captures the left image for the left eye 305L, and camera 320R captures the right image for the right eye 305R. As can be seen in FIG. 3B, the left camera 320L and left eye 305L are not at the exact same location, and the same goes for the right camera 320R and right eye 305R. Due to such discrepancies, the object 318 (as well as the scene 300 in general) would appear slightly different from the perspective of the cameras 320L, 320R and the user's eyes 305L, 305R. As shown, the line of sights 307L, 307R from cameras 320L, 320R to object 318 is different from the line of sights 306L, 306R from the user's eyes 305L, 305R, and object 318. As such, images captured by cameras 320L, 320R need to be reprojected to eyes 305L, 305R, respectively, in order for passthrough images of the scene 300 to have the correct viewer perspective. Once the left and right images are collected, the left and right images are respectively reprojected via a corresponding left depth mesh 342 of constant left depth and right depth mesh 341 of constant right depth. Image projection involves transforming image patches (e.g., stretching, skewing, resizing, or contracting patches) such that the transformed image represents a projection of the image captured by a camera onto a depth mesh surface and rendered for the user's eye. For example, the left image is projected onto the left depth mesh 342, and the right image is projected onto the right depth mesh 341. Subsequently, the left projected image, which may be referred to as the left passthrough image, is displayed for the user's left eye 305L. Similarly, the right projected image, which may be referred to as the right passthrough image, is displayed for the user's right eye 305R. In this example, since the constant depth meshes 342, 341 reflect the correct depth of object 318, the object 318 would appear correct in the passthrough images. Since the user is focusing on object 318, it is important for the object 318 to appear accurately and with minimal artifacts.

Figure 3C:
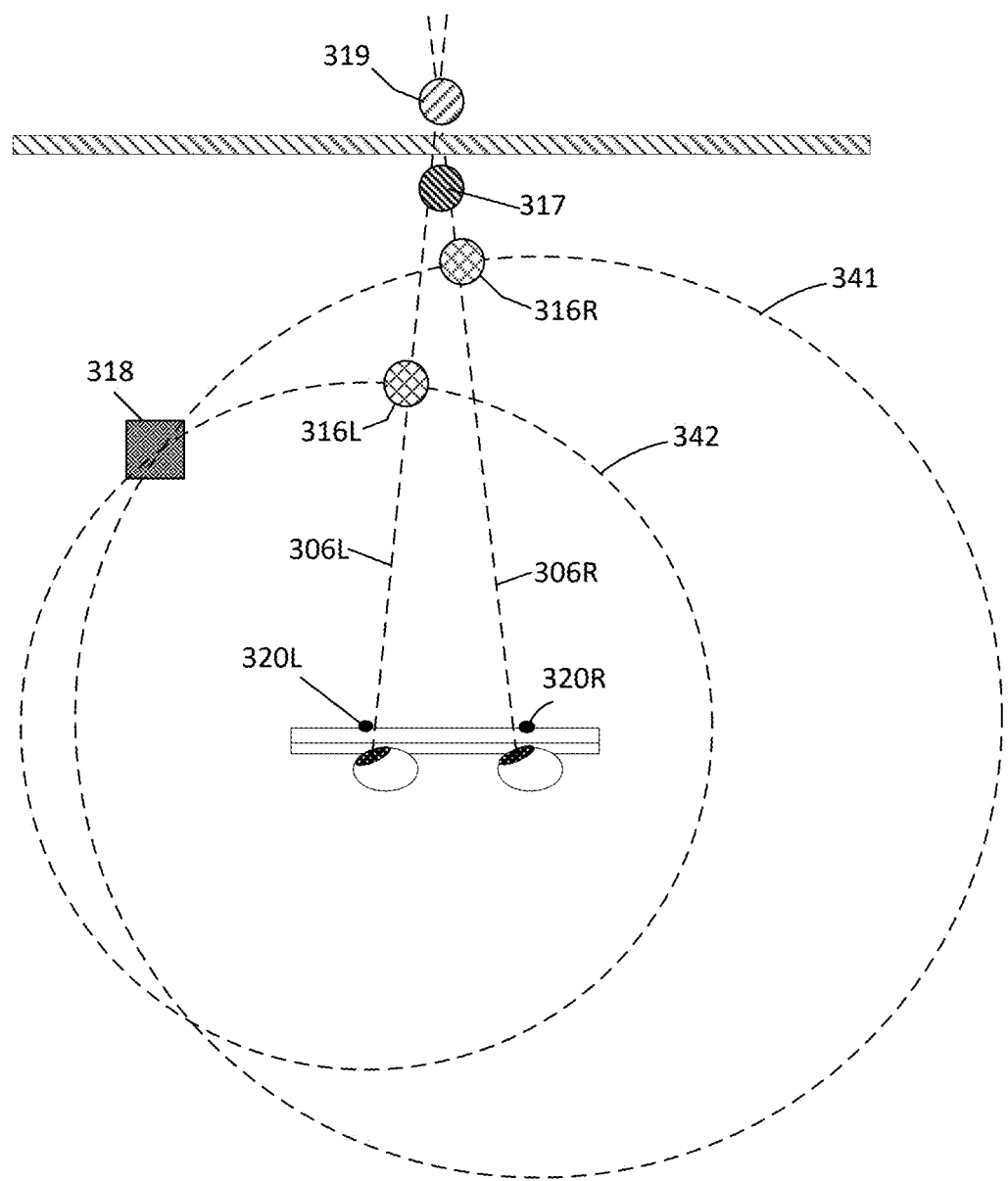
FIG. 3C is a diagram illustrating a projection of an image for an object onto constant depth meshes, in accordance with disclosed embodiments.

While object 318 may appear accurate in the passthrough images, other objects at different depths in the scene 300 might not be rendered accurately. For example, peripheral object 317 is much farther away from the user than object 318. As such, when using constant depth meshes 342, 341 (which are optimized for object 318 in this example) to reproject object 317, the reprojection of object 317 may not appear accurately (e.g., it may appear warped or deformed). This is illustrated in FIG. 3C, where peripheral objects like object 317 are reprojected using the constant depth left depth mesh 342 and right depth mesh 341. Image projection 316L represents the projection of object 317 onto left depth mesh 342, and image projection 316R represents the projection of object 317 onto right depth mesh 341. Since the constant depth meshes 342, 341 are optimized for object 318, the image projections 316L and 316R are misaligned and do not accurately reflect object 317. The end result may be that the object appears to the user as image 319 at the point where left and right sight lines 306L and 306R intersect, or artifacts such as warping and blurriness may result. However, since the user in this example is focusing on object 318 and not object 317, any inaccurate visual representation of object 317 might not be noticeable or have minimal impact on the user's overall experience. In particular embodiments, the system may further mitigate the inaccurate visual representation of object 317 by applying one or more filters, such as by blurring the regions in the user's periphery so that inaccuracies and warping artifacts would be less noticeable.

In particular embodiments, the MR system may dynamically adjust the constant depth meshes 341, 342 as needed. For example, the MR system may periodically repeat the process of determining the user's gaze directions, identifying a region of interest and its corresponding depth, using the depth to reconfigure the constant depth meshes for the left and right eyes, and reprojecting the captured images using the constant depth meshes to generate passthrough images. In particular embodiments, this process may repeat at a predetermined cadence (e.g., the process may repeat every frame or more than one frame). In other embodiments, the constant depth meshes may be reconfigured when the system determines that the user's gaze has shifted from an object or if the object has moved. For instance, if the user's gaze shifts from object 318 to object 317, the system could compute a depth of the object 317 for the left constant depth mesh and another depth of the object 317 for the right constant depth mesh. Now that the user's gaze has shifted, object 318 becomes a peripheral object and may appear warped or distorted in the passthrough image generated using the new constant depth meshes.

Figure 3D:
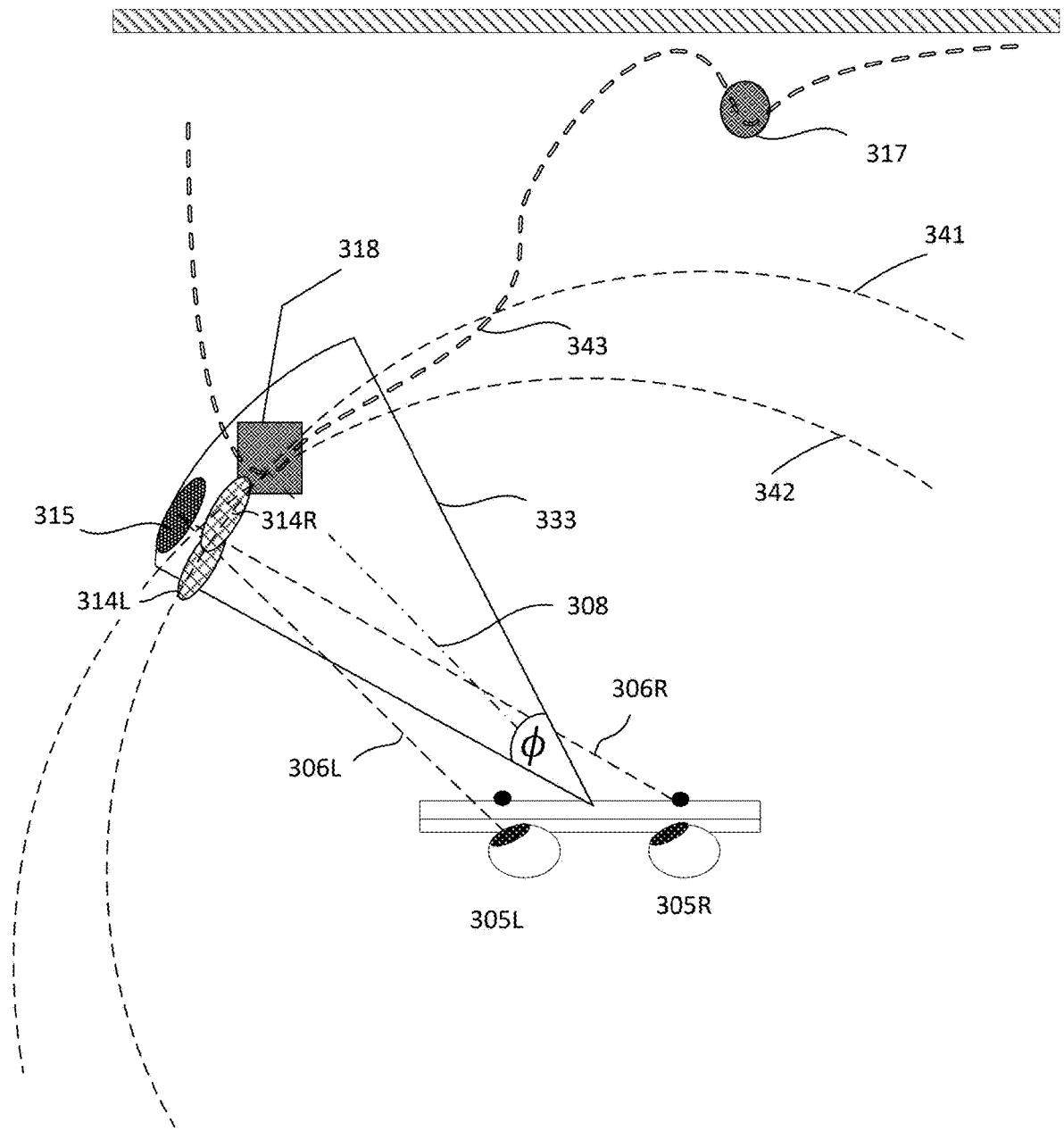
FIG. 3D is a diagram illustrating projections of images for several objects onto constant depth meshes and onto a variable depth mesh, in accordance with disclosed embodiments.

Various alternative hybrid approaches can be employed that combine projecting certain objects or portions of a scene onto a constant depth mesh while projecting other objects or portions of the scene onto a variable estimated depth mesh. FIG. 3D illustrates an example of such an embodiment. Here, the user is focused on object 318, resulting in the constant depth meshes 341, 342 being configured based on object 318's depth. An additional object 315 is situated within a viewing cone 333 of the user (e.g., a predefined limited field of view). Since object 315 is within the viewing cone 333, it is reprojected to the user's viewpoints using left constant depth mesh 342 and right constant depth mesh 341. As depicted in FIG. 3D, a left projection of object 315 is represented by 314L along left sight line 306L, and a right projection of object 315 is represented by 314R along right sight line 306R. Objects located outside viewing cone 333, such as object 317, may be reprojected to the user's viewpoint via variable depth mesh 343. The benefit of doing so is that the variable depth mesh 343 would likely be more accurate for object 317 than the constant depth meshes 341, 342. Viewing cone 333 can be determined using any appropriate method. In an exemplary implementation, viewing cone 333 may have an apex positioned between the user's left eye 305L and right eye 305R (e.g., at the midpoint between the user's eyes) and may have a cone axis aligned with gaze direction 308. Additionally, the aperture, as shown in FIG. 3D, can take on any suitable value, which, for example, can range between 5 and 100 degrees, or can have any other appropriate value. In some cases, selecting the aperture may include determining the largest characteristic size of the object as observed in the left image and the right image, and selecting a diameter of a base of the viewing cone to be at least the largest characteristic size of the object. Upon such selection, the aperture then can be calculated as twice the inverse tangent of a ratio between the diameter and an object's depth, where the object's depth is assessed through the depth estimation module along gaze direction 308.

Figure 3E:
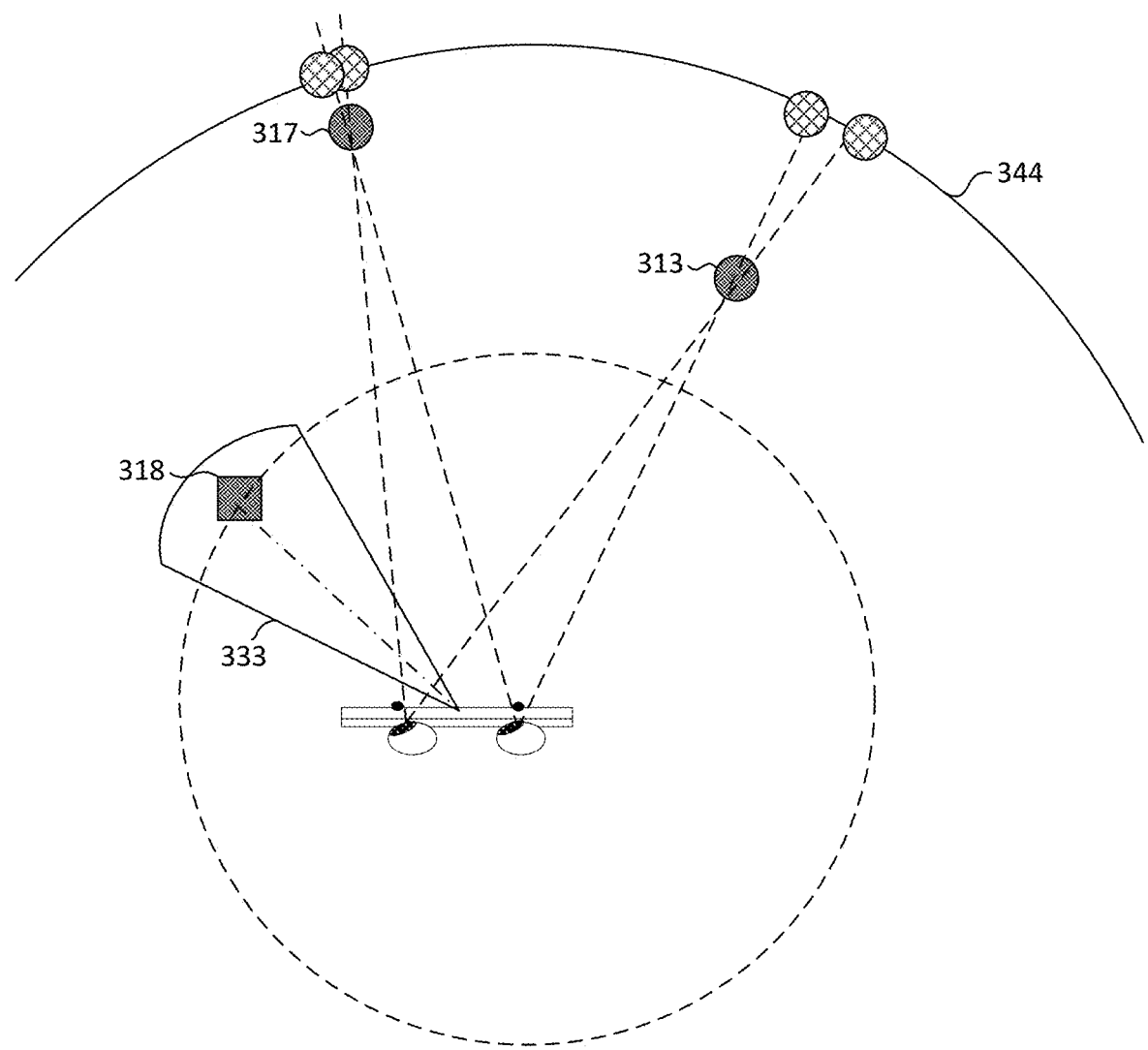
FIG. 3E is a diagram illustrating projections of images for several objects onto constant depth meshes, in accordance with disclosed embodiments.

FIG. 3E illustrates an alternative hybrid approach. Similar to the embodiment described with reference to FIG. 3D, images of objects located inside viewing cone 333 are reprojected using constant depth meshes generated based on the user's region of interest (e.g., constant depth meshes 341 and 342, which are shown in FIG. 3D but omitted in FIG. 3E for simplicity). However, unlike the previous embodiment, objects located outside of viewing cone 333 are reprojected using a large default constant depth mesh 344 instead of variable depth mesh 343. For example, objects 317 and 313, which are outside of the user's viewing cone 333, may be reprojected to the user's viewpoint using the default constant depth mesh 344. The default constant depth mesh 344 may be particularly suitable for reprojecting the background scene. The default constant depth mesh 344 may have a depth that is larger than either of the constant depth meshes 341, 342. The depth of the larger constant depth mesh 344 may be a predetermined default value or computed based on an average or approximation of the depths of objects outside of the viewing cone 333. In particular embodiments, a single default constant depth mesh 344 may be utilized for reprojecting both left and right images of objects 317 and 313.

The approaches are illustrated in FIGS. 3A-3E can be combined in various ways to create a method for rendering objects within a scene in three dimensions for a user. For instance, images of some objects within a first viewing cone can be projected onto a first left depth mesh with a first constant left depth and a first right depth mesh with a first constant right depth, while images of other objects located within a second viewing cone but outside the first viewing cone can be projected onto a second left depth mesh and a second right depth mesh having corresponding second constant left depth and second constant right depth. In some scenarios, the same constant depth mesh can be used to project both left and right images. In other scenarios, images for objects located in close proximity to the user may be projected onto constant depth left and right meshes, while images for objects located further away from the user may be projected onto a large constant depth mesh or a variable estimated depth mesh for the scene.

The constant depth mesh reprojection techniques may not be a one-size-fits-all solution to all scenarios. For example, reprojection based on constant depth meshes is suitable when the scene depth is fairly constant, such as when the user is sitting. However, it is less suitable when the depth of the environment varies significantly and the user is likely looking at a variety of objects at different depths (e.g., when the user is walking). Thus, in particular embodiments, an MR system may adaptively select a particular type of depth mesh to use for reprojection depending on the user's current context. The MR system may determine the current usage context by analyzing sensor data captured by one or more types of sensors and techniques (e.g., accelerometer, gyroscope, inertial measurement unit, cameras, depth sensors, localization and tracking techniques, etc.). For example, the MR system may use such sensor data to monitor the user's movements and predict whether the user is likely to be stationary and fixated in a particular direction (i.e., user exhibits no lateral or rotational movement), stationary but looking around in no particular direction (i.e., user exhibits rotational movement but no lateral movement), or moving and looking around (i.e., user exhibits both rotational and lateral movements). The MR system may further use its knowledge of the user's current state in the MR application to predict the user's usage context. For example, if the user is watching a virtual TV in MR, the user is likely stationary. As another example, if the user is using a navigation MR application, the MR system could conclude that the user is likely walking outdoors. One of ordinary skill in the art would recognize that the MR system could use any combination of sensor data, tracking techniques, and MR application state to determine the user's current usage context.

Figure 4:
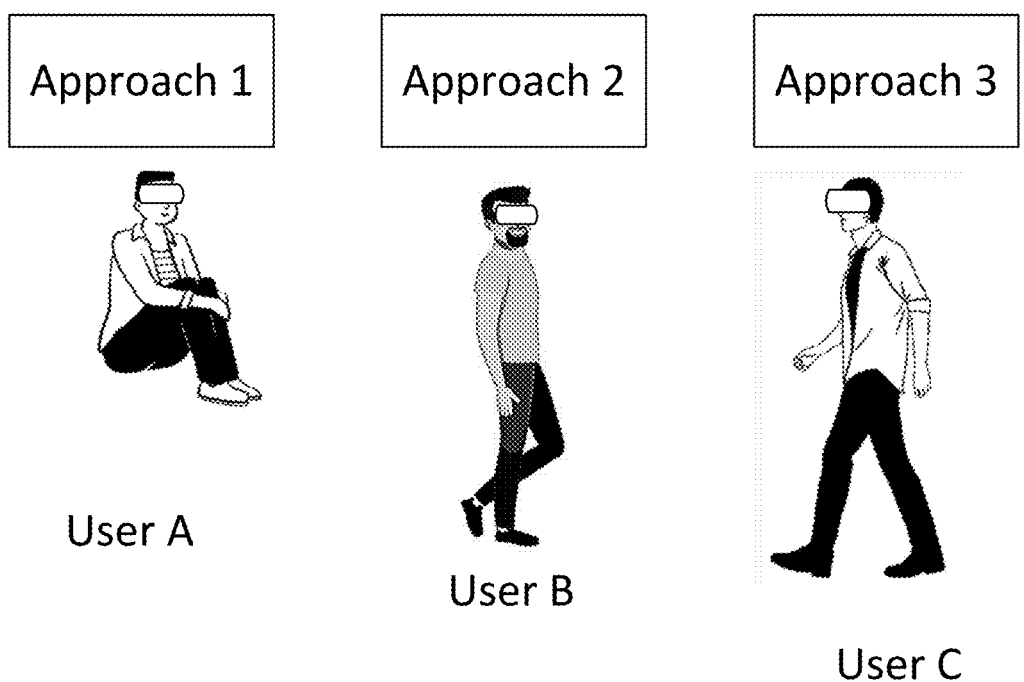
FIG. 4 is a schematic illustration listing several approaches for displaying a scene to a user based on a movement and position of the user, in accordance with disclosed embodiments.

The MR system may adaptively select different types of depth mesh to use for passthrough generation, depending on the user's usage context. FIG. 4 schematically illustrates three distinct approaches (Approach 1-3) that can be tailored to the user's actions or usage context. For example, when user A is stationary and generally looking in the same direction at a scene with approximately uniform depth (e.g., watching TV), the MR system may elect Approach 1, which may involve using a planar constant depth mesh for reprojection. Using a planar constant depth mesh may be advantageous in such usage cases since the planar mesh is a better approximation of the substantially uniform scene depth (e.g., the side of the room at which the TV is placed is often planar). The planar constant depth mesh may be positioned in the user's viewing direction and oriented to match the scene. Similar to the spherical constant depth mesh described earlier, the depth of the planar constant depth mesh may be adjusted depending on the region of interest of the user.

In another use case where a user exhibits rotational movement but is stationary (e.g., user B in FIG. 4 is standing or sitting in the same location but may be looking in different directions), the MR system may select Approach 2 to generate passthrough images. For example, Approach 2 may involve using a spherical constant depth mesh, similar to the techniques described with reference to FIGS. 3A-E.

In yet another use case, a user may exhibit both rotational and lateral movements (e.g., user C in FIG. 4 is walking). Especially when the user is moving in such a manner in an environment with significant depth variations (e.g., walking outdoors), constant depth meshes may not provide the best results. Thus, when the user exhibits both rotational and lateral movements, the MR system may elect to use a variable depth mesh instead of a constant depth mesh since the variable depth mesh would be able to accommodate the complex scene better.

Alternatively or in addition to considering the user's movements, the MR system may consider the approximate distance between the user and the scene of interest when selecting the type of depth mesh to use. As previously mentioned, the MR system may use eye tracking/vergence information and/or information about the scene (e.g., depth information captured using depth sensors, contextual information, etc.) to determine the approximate distance of the scene of interest to the user. When the MR system determines that the scene of interest is within a threshold distance that is considered close to the user (e.g., within a threshold of 1, 1.5, or 2 meters), the MR system may elect to use constant depth meshes for passthrough generation. The particular type of constant depth mesh (e.g., spherical or planar) used could further depend on whether the user is likely to exhibit rotational movement. For example, when the user is viewing something nearby and rotational movement is unlikely (e.g., the user is viewing a display or reading content), the MR system may choose to use a planar constant depth mesh to perform reprojections. On the other hand, when the user is viewing something nearby and rotational movement is likely (e.g., the user is not looking at any particular content), the MR system may choose to use a spherical constant depth mesh. In scenarios where the user is viewing a scene that is far away (e.g., beyond a predetermined threshold, such as 2, 3, 5, or 10 meters), the MR system may choose to use a variable depth mesh instead of a constant depth mesh to perform reprojections for passthrough generation. In particular embodiments, the MR system may further differentiate mid-range versus far-range scenes. For example, if the user is viewing a scene that is within a predetermined middle range (e.g., between 2-4 meters, 3-5 meters, etc.), the MR system may use a variable depth mesh to perform reprojections. On the other hand, if the user is viewing a far-range scene that is beyond a certain threshold (e.g., farther than 5, 7, or 10 meters away), the scene is effectively at infinity and, as such, the MR system may choose to use a planar constant depth mesh instead.

Figure 7:
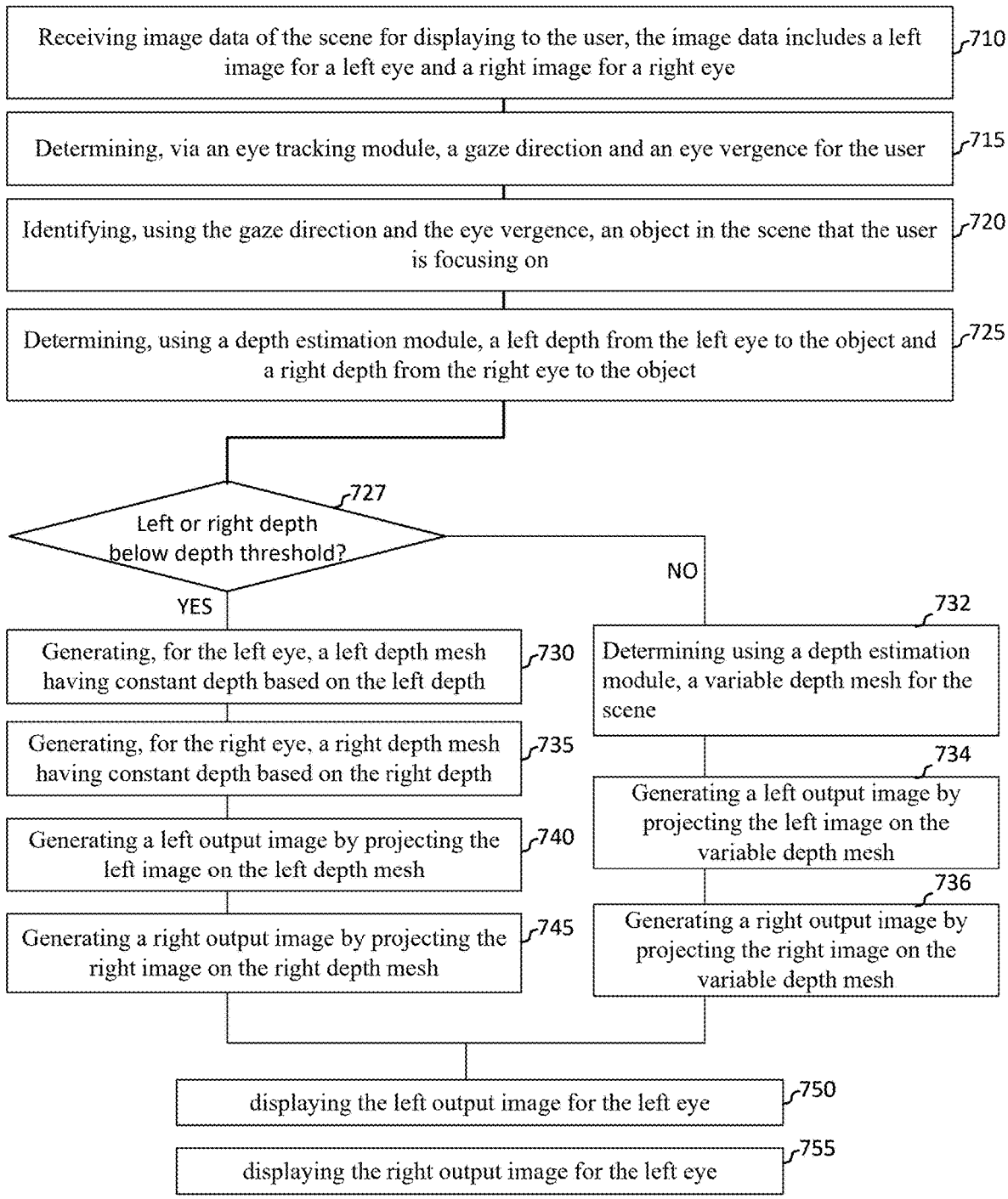
FIG. 7 is another example method for displaying a scene to a user by projecting objects in the vicinity of the user onto constant depth meshes, in accordance with disclosed embodiments.

Further insights into displaying a scene to a user are described in various embodiments of methods outlined in FIGS. 5-7. These methods can be executed by a system similar to or identical to system 100, shown in FIG. 1.

FIG. 5 shows an embodiment of method 500 designed for generating and presenting a passthrough scene to a user. At step 510, method 500 includes receiving image data of the scene for displaying to the user; the image data includes a left image for a left eye and a right image for a right eye. As previously described, the left image may be the image of the scene obtained by a left camera (e.g., left camera 220L as shown in FIG. 2A), while right image may be the image of the scene obtained by a right camera (e.g., right camera 220R, as shown in FIG. 2A). In certain instances, these left and right images can constitute image frames of a video feed, systematically gathered at a chosen frame rate (e.g., 24, 30, 60, 90 or 120 frames per second). In some cases, a light emitting module, such as light emitting module 160 in FIG. 1, may be employed to improve the lighting of the environment to improve image capture.

Further, at step 515, method 500 includes determining, via an eye tracking module, a gaze direction and/or an eye vergence for the user. The eye tracking module may include cameras integrated within the user's HMD and pointed at the user's eyes. By analyzing the reflections in the user's eyes captured by the cameras, the eye tracking module may compute the user's gaze direction and/or eye vergence.

At step 520, method 500 includes identifying, using the gaze direction and/or the eye vergence, an object in the scene that the user is focusing on. The object may be identified by identifying a position in space where sight lines, such as left and right sight lines 306L and 306R, as shown in FIG. 3B, cross, thereby identifying the object on which the user is focusing. In some embodiments, object identification may not be explicit, as the system could infer that an object of interest is likely located at the user's gaze vergence location. At step 525, method 500 includes determining a left depth from the left eye to the object and a right depth from the right eye to the object. The left depth and the right depth may be identified via a triangulation procedure using the angles by which the left eye and the right eye are rotated relative to a normal direction. For example, as shown in FIG. 3B, angles $\theta_L$ and $\theta_R$ may be used as well as distance $D_{LR}$ to determine sides of a triangle formed between object 318, a gaze direction of left eye 305L, and a gaze direction of right eye 305R of the user, thereby determining the left depth representing the distance from left eye 305L to object 318, and the right depth representing the distance from right eye 305R to object 318. In some cases, in addition to the triangulation process, or alternative to the triangulation process, the determination of both the left depth and the right depth can be accomplished using a suitable depth sensor. This could include a time-of-flight depth sensor, or any similar sensor as detailed in the earlier description of system 100. In one implementation, the MR system could project the user's eye gazes into the scene and, based on scene depth information captured using depth sensors, compute points of intersection between the scene and the user's left and right gazes.

Distances between the points of intersection and the user's eyes may then be computed and used as the left and right depths for the user's eyes. For example, the depth sensor may be configured to determine a depth value to the object using the depth sensor along, for example, gaze direction 308, as shown in FIG. 3B. Subsequently, this determined depth value is relayed to a computing device, such as computing device 101, illustrated in FIG. 1. The computing device may be configured to calculate the left depth to the object, incorporating the depth value, gaze direction, and/or the vector between the left eye and the depth sensor. Additionally, the computing device is configured to determine the right depth to the object by leveraging the depth value, gaze direction, and/or the vector between the right eye and the depth sensor.

At step 530, method 500 includes generating, for the left eye, a left depth mesh having constant depth based on the left depth, and at step 535, generating, for the right eye, a right depth mesh having constant depth based on the right depth. The left and right depth meshes can constitute segments of a spherical mesh, each maintaining consistent left and right depths. One of ordinary skill in the art would appreciate that the sequence in which these two depth meshes are generated could vary (e.g., the two could be generated in parallel or in any sequence).

At step 540, method 500 includes generating a left output image by projecting the left image on the left depth mesh and to the user's left eye, and at step 545, generating a right output image by projecting the right image on the right depth mesh and to the user's right eye. One of ordinary skill in the art would appreciate that the sequence in which these two out images are generated could vary (e.g., the two could be generated in parallel or in any sequence). The process of projecting an image obtained by a camera onto a depth mesh may involve mapping the pixel information from the image onto the corresponding locations in the depth mesh. This mapping is typically done based on the spatial relationships established between the pixels in the image and the corresponding points or vertices in the depth mesh. The projection of an image onto a depth mesh may involve aligning the pixel coordinates in the image with the spatial coordinates in the depth mesh. The image obtained by the camera is effectively used as a texture of the depth mesh. Then, the projected left and right images are rendered from the viewpoint of the user's left and right eyes, respectively (i.e., the captured images are reprojected to the user's eyes).

At step 550, the method 500 displays the left output image for the left eye of the user. At step 555, the method displays the right output image for the right eye of the user. The displayed images may be rendered using a suitable display module, such as display module 150 of system 100, as shown in FIG. 1.

FIG. 6 shows another embodiment of a method 600 for generating and displaying a passthrough scene to the user. Method 600 employs a hybrid approach that reprojects one portion of a captured image using a constant depth mesh and another portion of the image using a variable depth mesh. Method 600 includes steps 610-635, which may be similar or identical to steps 510-535 of method 500. Additionally, method 600 includes step 637 of determining, using a depth estimation module, a variable depth mesh for the scene. The variable depth mesh for the scene may closely resemble or be identical to the variable depth mesh 343, as depicted in FIG. 3A, for instance. In certain scenarios, variable depth mesh 343 can be acquired through the utilization of a depth sensor configured to scan the user's environment for the purpose of determining a depth mesh.

At step 639, method 600 generates a first left output image by reprojecting a first portion of the left image using the left constant depth mesh. The first portion of the left image may be a specific portion of the left image that includes details in close proximity to the object onto which the user is focusing. As an illustration, this first portion of the left image may include image data for all objects within a defined viewing cone, such as viewing cone 333 in FIG. 3D.

Similar to step 639, at step 641, method 600 generates a first right output image by reprojecting a first portion of the right image using the right constant depth mesh. Similar to step 639, this designated portion of the right image encapsulates details in proximity to the object onto which the user is focusing. The spatial range is often defined by a relevant viewing cone, similar to the one mentioned in step 639.

At step 643, method 600 generates a second left output image by reprojecting a second portion of the left image using the variable depth mesh, the second portion of the left image being complimentary to the first portion of the left image. For example, the second portion of the left image may include image data for all the objects that are outside a viewing cone, such as viewing cone 333, as shown in FIG. 3D. In some cases, prior to reprojecting, the second portion of the left output image may be blurred to indicate that objects represented by this image data are further away from the user.

Similar to step 643, at step 645, method 600 generates a second right output image by reprojecting a second portion of the right image using the variable depth mesh, the second portion of the right image being complimentary to the first portion of the right image. Similar to step 643, this second designated portion of the right image encapsulates image data for all the objects that are outside a viewing cone, such as viewing cone 333, as shown in FIG. 3D. In some cases, prior to reprojecting, the second portion of the right output image may be blurred to indicate that objects represented by this image data are further away from the user.

In certain cases, if the first portion of the left (or right) image includes image data corresponding to objects within a first viewing cone, the second portion of the left (or right) image may include image data for objects located outside a second viewing cone, positioned within the boundaries of the first viewing cone. Such selection of the first and second portions facilitates an intentional overlap between the first portion of the left (or right) image and the second portion of the left (or right) image, ensuring a cohesive transition between the first portion and the second portion when projections for such portions are subsequently combined at step 647 (or step 649) of method 600, that is further described below.

At steps 647 and 649, method 600 combines (1) the generated first and second left output image to generate a combined left output image (step 647) and (2) the generated first and second right output image to generate a combined right output image (step 649). As mentioned above, in some cases, the first and second portions of the left image may overlap in at least some areas for improved subsequent combination of the first and the second generated left output image into the combined left output image. Similarly, the first and second portions of the right image may overlap in at least some areas for improved subsequent combination of the first and the second generated right output image into the combined right output image.

When different portions of an image are projected onto one or more depth meshes, the process of combining or stitching these images may involve aligning and blending the overlapping or touching regions to create a seamless and cohesive final image. Such image stitching process may include feature matching, which involves identifying distinctive features in the overlapping areas of adjacent images. These features could include key points, corners, or edges. Further, stitching process may include image alignment, and/or application of geometrical transformations (e.g., translation, rotation, or scaling) to align the images properly. Transformation matrices can be used for this purpose. Further, stitching may include blending the overlapping regions to eliminate visible seams by, for example, adjusting pixel intensities at the boundaries to create a seamless transition between adjacent images. Additionally, stitching can include color correction by ensuring consistency in color and brightness across the stitched images. Further, color correction techniques may be applied to improve the overall appearance. Similarly, color corrections may be used to ensure that the left output image matches in color, and/or brightness, and/or sharpness of the right output image.

At steps 651 and 653, method 600 respectively displays (1) the combined left output image for the left eye of the user and (2) the combined right output image for the right eye of the user. The displayed images may be rendered using a suitable display module, such as display module 150 of system 100, as shown in FIG. 1.

FIG. 7 shows a method 700 for adaptively selecting different types of depth meshes for passthrough generation. Steps 710-725 may be similar or identical to corresponding steps 510-525 of method 500 or corresponding steps 610-625 of method 600. Additionally, at step 727, method 700 may evaluate whether at least one of the left depth or the right depth is below a depth threshold (i.e., the depth is sufficiently close). The depth threshold can be chosen through various means and have any suitable values such as a few tens of centimeters, half a meter, a meter, a few meters, or any distance within the range of a few centimeters to a few meters. In certain instances, the depth threshold is adjustable on an individual basis for each user. Alternatively, it may be determined based on an overall reduction of artifacts when presenting a scene to the user. When either the left depth or the right depth is below the depth threshold (step 727, YES), method 700 may decide that a constant depth mesh is appropriate for passthrough generation. As such, method 700 may proceed to steps 730-755, which may be similar or identical to corresponding steps 530-555 of method 500. On the other hand, when neither the left depth nor the right depth is below the depth threshold (step 727, NO), method 700 may decide that a variable depth mesh is more appropriate for the scene. As such, method 700 may proceed to step 732 of determining, using a depth estimation module, a variable depth mesh of the scene. Step 732 may be similar or identical to step 637 of method 600. Further, upon completion of step 732, method 700 includes, at step 734, generating a left output image by reprojecting the left image using a variable depth mesh, and at step 736, generating a right output image by reprojection the right image using the variable depth mesh. Subsequently, method 700 may proceed to steps 750 and 755, which may be similar or identical to steps 550 and 555 of method 500.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

What is claimed is:

1. A method for displaying a scene to a user, the method comprising, by a computing device:
   receiving image data of the scene for displaying to the user, the image data includes a left image for a left eye and a right image for a right eye;
   determining, via an eye tracking module, at least one of a gaze direction or an eye vergence for the user;
   identifying, using at least one of the gaze direction or the eye vergence, an object in the scene that the user is focusing on;
   determining a first distance from the left eye to the object and a second distance from the right eye to the object;
   generating, for the left eye, a left depth mesh surface having a constant depth equal to the first distance;
   generating, for the right eye, a right depth mesh surface having a constant depth equal to the second distance;
   generating a left passthrough image by projecting the left image on the left depth mesh surface;
   generating a right passthrough image by projecting the right image on the right depth mesh surface;
   displaying the left passthrough image for the left eye; and
   displaying the right passthrough image for the right eye.

2. The method of claim 1, wherein the computing device is communicatively connected to a left external-facing camera and a right external-facing camera of a head-mounted device worn by the user, and wherein the left image is obtained by the left external-facing camera and the right image is obtained by the right external-facing camera.

3. The method of claim 1, wherein the eye tracking module includes cameras pointing at the left eye and the right eye of the user.

4. The method of claim 1, wherein a location of the object is determined based on the eye vergence of the user.

5. The method of claim 4, wherein the location of the object is further determined based on scene information.

6. The method of claim 1, wherein identifying the object in the scene comprises determining an intersection between the gaze direction of the user and a scene depth.

7. The method of claim 1, wherein identifying the object in the scene comprises determining an intersection between the gaze direction of the user and a 3D model of the scene.

8. The method of claim 1, wherein identifying the object in the scene is further based on a current usage context of the computing device.

9. The method of claim 1, wherein the left depth mesh surface and the right depth mesh surface are spherical.

10. The method of claim 1, wherein the constant depth of the left depth mesh surface is different from the constant depth of the right depth mesh surface.

11. The method of claim 1, further comprising:
  identifying, subsequent to generating the left depth mesh surface and the right depth mesh surface, a second object in the scene that the user is focusing on using at least one of a second gaze direction or a second eye vergence of the user, wherein the second object and the object are different;
  determining a third distance from the left eye to the second object and a fourth distance from the right eye to the second object;
  generating, for the left eye, a second left depth mesh surface having a constant depth equal to the third distance;
  generating, for the right eye, a second right depth mesh surface having a constant depth equal to the fourth distance;
  generating a second left passthrough image using the second left depth mesh surface;
  generating a second right passthrough image using the second right depth mesh surface;
  displaying the second left passthrough image for the left eye; and
  displaying the second right passthrough image for the right eye.

12. One or more computer-readable non-transitory storage media embodying software that is operable when executed to:
  receive image data of a scene surrounding a user, the image data includes a left image for a left eye and a right image for a right eye;
  determine, via an eye tracking module, at least one of a gaze direction or an eye vergence for the user;
  identify, using at least one of the gaze direction or the eye vergence, an object in the scene that the user is focusing on;
  determine a first distance from the left eye to the object and a second distance from the right eye to the object;
  generate, for the left eye, a left depth mesh surface having a constant depth equal to the first distance;
  generate, for the right eye, a right depth mesh surface having a constant depth equal to the second distance;
  generate a left passthrough image by projecting the left image on the left depth mesh surface;
  generate a right passthrough image by projecting the right image on the right depth mesh surface;
  display the left passthrough image for the left eye; and
  display the right passthrough image for the right eye.

13. The one or more computer-readable non-transitory storage media of claim 12, wherein a location of the object is determined based on the eye vergence of the user.

14. The one or more computer-readable non-transitory storage media of claim 13, wherein the location of the object is further determined based on scene information.

15. The one or more computer-readable non-transitory storage media of claim 12, wherein the left depth mesh surface and the right depth mesh surface are spherical.

16. A system comprising:
  one or more processors; and
  one or more computer-readable non-transitory storage media coupled to one or more of the processors and storing instructions operable when executed by one or more of the processors to cause the system to:
    receive image data of a scene surrounding a user, the image data includes a left image for a left eye and a right image for a right eye;
    determine, via an eye tracking module, at least one of a gaze direction or an eye vergence for the user;
    identify, using at least one of the gaze direction or the eye vergence, an object in the scene that the user is focusing on;
    determine a first distance from the left eye to the object and a second distance from the right eye to the object;
    generate, for the left eye, a left depth mesh surface having a constant depth equal to the first distance;
    generate, for the right eye, a right depth mesh surface having a constant depth equal to the second distance;
    generate a left passthrough image by projecting the left image on the left depth mesh surface;
    generate a right passthrough image by projecting the right image on the right depth mesh surface;
    display the left passthrough image for the left eye; and
    display the right passthrough image for the right eye.

17. The system of claim 16, wherein a location of the object is determined based on the eye vergence of the user.

18. The system of claim 17, wherein the location of the object is further determined based on scene information.

19. The system of claim 16, wherein the left depth mesh surface and the right depth mesh surface are spherical.

* * * * *